United States Patent
Yeh et al.

(10) Patent No.: US 7,990,701 B2
(45) Date of Patent: Aug. 2, 2011

(54) COMPUTER DEVICE WITH LOW ACOUSTIC NOISE

(75) Inventors: Chin-Wen Yeh, Taipei Hsien (TW);
Zhen-Neng Lin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 7 days.

(21) Appl. No.: 12/603,665

(22) Filed: Oct. 22, 2009

(65) Prior Publication Data
US 2011/0063795 A1    Mar. 17, 2011

(30) Foreign Application Priority Data

Sep. 11, 2009 (CN) .................. 2009 2 0310187 U

(51) Int. Cl.
*H05K 7/20* (2006.01)

(52) U.S. Cl. .................. 361/679.48; 361/692; 361/695; 165/121; 165/122; 181/202; 181/206; 181/210; 181/225; 454/184; 381/71.3; 381/71.5

(58) Field of Classification Search ............ 361/679.01, 361/679.02, 679.46, 679.48, 690–697, 724–727, 361/800, 816, 818, 831; 174/50, 35 BC, 174/350, 358, 35 MS, 377; 454/184; 427/58; 181/141, 208, 286, 225, 290, 202, 206, 198, 181/226; 428/116, 324, 325, 327, 328, 316.6, 428/304.4, 305.5, 550; 442/370, 120, 394, 442/136, 414, 415; 29/402.02, 402.06, 840, 29/841, 865

See application file for complete search history.

(56) References Cited

U.S. PATENT DOCUMENTS

| | | | | |
|---|---|---|---|---|
| 3,969,572 | A | * | 7/1976 | Rostek .......................... 174/353 |
| 4,461,796 | A | * | 7/1984 | Fukahori et al. .............. 428/116 |
| 4,493,471 | A | * | 1/1985 | McInnis ........................ 248/580 |
| 5,526,228 | A | * | 6/1996 | Dickson et al. ............... 361/695 |
| 6,104,608 | A | * | 8/2000 | Casinelli et al. .............. 361/692 |
| 6,141,213 | A | * | 10/2000 | Antonuccio et al. ..... 361/679.48 |
| 6,198,627 | B1 | * | 3/2001 | Roehling et al. .............. 361/688 |
| 6,243,262 | B1 | * | 6/2001 | Koo et al. ................. 361/679.46 |
| 6,570,755 | B2 | * | 5/2003 | Curlee et al. ............. 361/679.58 |

(Continued)

FOREIGN PATENT DOCUMENTS

DE        29721136 U1  *  2/1998

OTHER PUBLICATIONS

Article: "Low Noise Air Moving Chamber for an Electronic Enclosure", IBM Technocal Disclosure Bulletin, Sep. 1977, vol. No. 20, Issue No. 4, p. No. 1336.*

*Primary Examiner* — Michael V Datskovskiy
(74) *Attorney, Agent, or Firm* — D. Austin Bonderer

(57) ABSTRACT

A computer system includes a chassis with a fan installed therein, a cover plate adapted to be attached to the chassis, and a noise absorber attached to the cover plate. The fan is capable of generating an amount of air flow for cooling at least a component in the chassis. The noise absorber includes a plurality of protrusions facing the fan and capable of damping the air flow that impacts the cover plate and decreasing an acoustic noise level of the computer system.

14 Claims, 4 Drawing Sheets

U.S. PATENT DOCUMENTS

| | | |
|---|---|---|
| 6,621,000 B2 * | 9/2003 | Jensen et al. .................. 174/359 |
| 6,657,858 B2 * | 12/2003 | Rothschild ............... 361/679.33 |
| 7,161,801 B2 * | 1/2007 | Chen et al. .................... 361/690 |
| 7,382,632 B2 * | 6/2008 | Alo et al. ....................... 361/825 |
| 7,549,505 B1 * | 6/2009 | Kawar .......................... 181/210 |
| 7,762,373 B2 * | 7/2010 | Bolton et al. ................. 181/225 |
| 7,783,055 B2 * | 8/2010 | Barath et al. ................. 381/71.3 |
| 7,800,895 B2 * | 9/2010 | Inoue et al. ............... 361/679.34 |
| 2001/0001433 A1 * | 5/2001 | Lee ............................... 181/290 |
| 2003/0085050 A1 * | 5/2003 | Zarganis et al. ......... 174/35 MS |
| 2005/0132885 A1 * | 6/2005 | Zarganis et al. ................ 95/285 |
| 2006/0227526 A1 * | 10/2006 | Alo et al. ....................... 361/825 |
| 2007/0110255 A1 * | 5/2007 | Barath et al. ................. 381/71.5 |

\* cited by examiner

COMPUTER DEVICE WITH LOW ACOUSTIC NOISE

BACKGROUND

1. Technical Field

The present disclosure relates to computer devices with means for decreasing an acoustic noise level thereof during operation.

2. Description of Related Art

Computers typically utilize numerous components which generate heat. If the heat is not dissipated properly, this heat tends to degrade the performance of the computer, and further cause system failure under certain circumstances. A desktop computer, for example, typically incorporates within a single housing numerous heat-producing components, including a power source, memory boards, a motherboard, one or more processors, and disk drive devices. The heat generated by these components is frequently dissipated through the use of an air cooling system in which air is passed through the computer housing from top to bottom, bottom to top, bottom to side, front to back, or a combination thereof. A fan typically facilitates the passage of air through the housing.

The dissipation of heat in a desktop computer becomes particularly significant when the capabilities of an existing desktop computer are enhanced with, for example, a new power source which provides greater power to the computer, or the use of more boards, or more processors. The need to enclose a greater number of components, each of which generates a greater amount of heat, within the same, or smaller size housing presents substantial heat dissipation problems.

Any design for a computer cooling system must further consider the problem of noise generated by the operation of the cooling system. High noise levels are undesirable to a computer user, tending to adversely affect user productivity and health. The operation of a large fan operating at a high speed within a desktop computer, for example, tends to cause an unacceptably high level of noise. Accordingly, a cooling system for a computer system should ideally provide dedicated and sufficient cooling at a low noise level.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
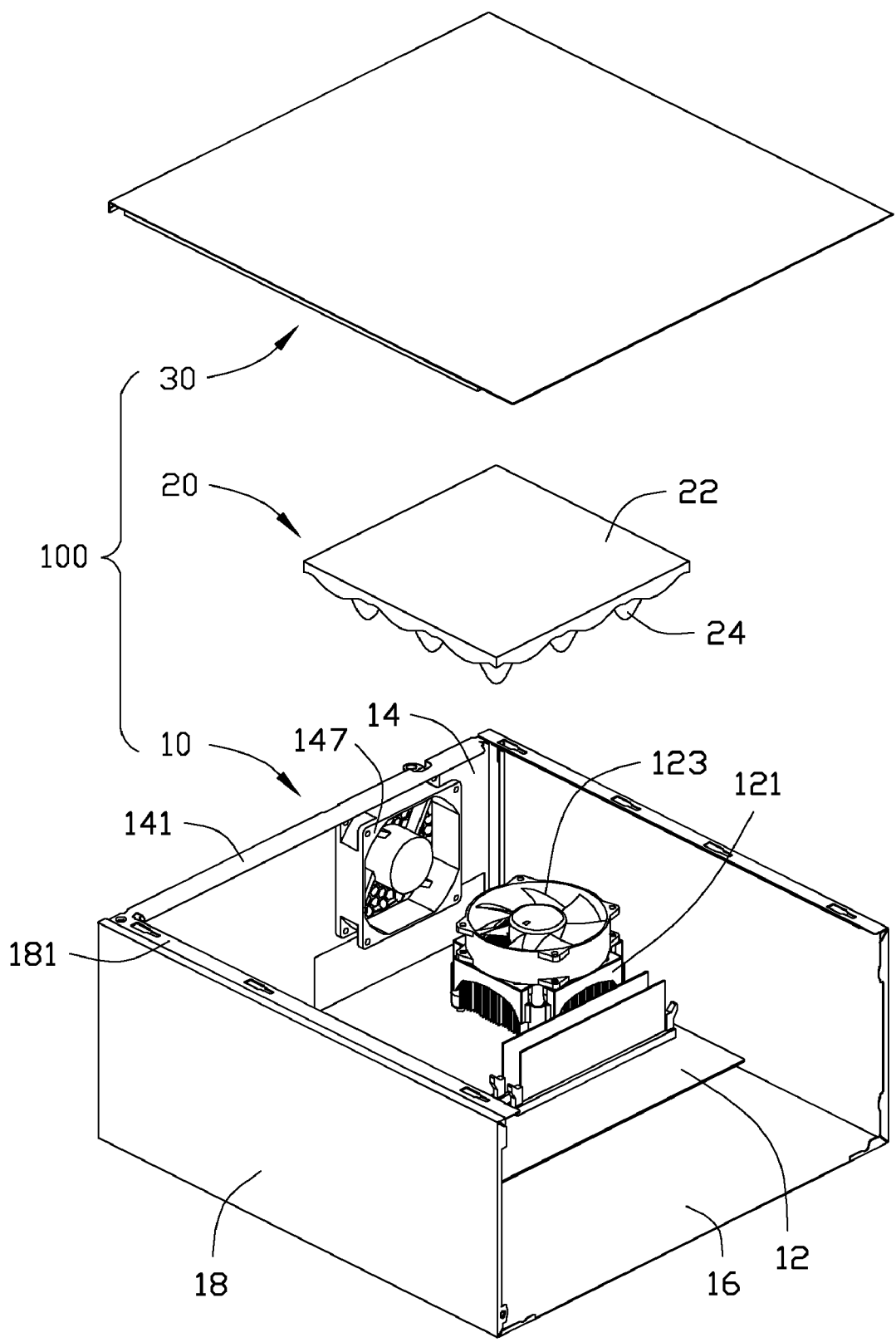
FIG. 1 is an exploded view of a computer device with low acoustic noise in accordance with the present disclosure.
Figure 2:
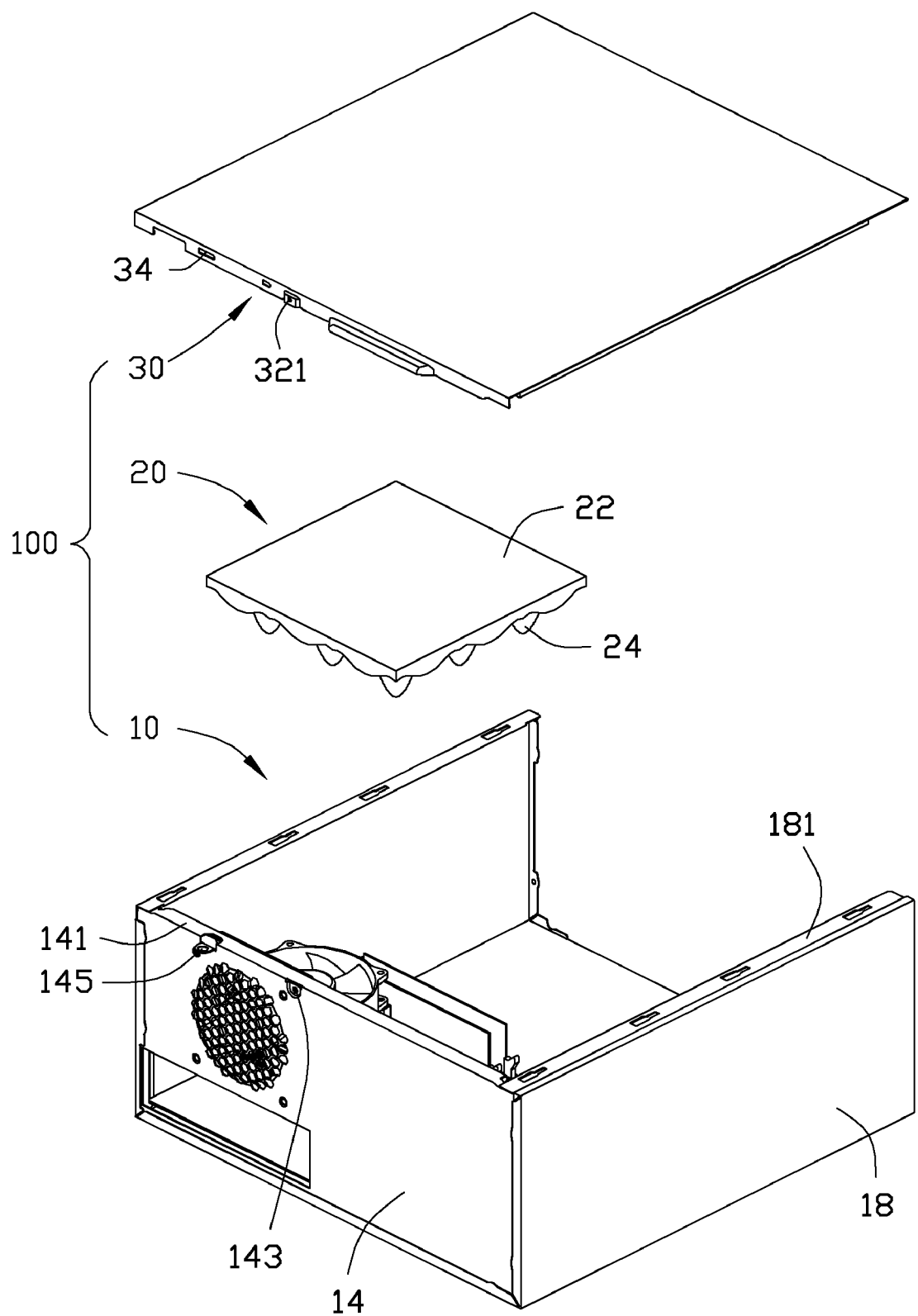
FIG. 2 is similar to FIG. 1, but viewed from another aspect.

Referring to FIGS. 1 and 2, an embodiment of a computer device 100 includes a chassis 10, a cover plate 30 adapted to cover the chassis 10, and a noise absorber 20 configured to be attached to the cover plate 30.

The chassis 10 of the computer device 100 includes a rear panel 14, a bottom panel 16, and a pair of side panels 18. A motherboard 12 is attached on the bottom panel 16 of the computer device 100. A heat sink 121 is attached on a central processing unit (CPU, not shown) of the motherboard 12. A CPU fan 123 is attached on the heat sink 121 mainly for dissipating heat generated by the CPU. The CPU fan 123 has a circular outlet (not labeled) for air flow. A system fan 147 is attached to the rear panel 10 of the chassis 10 of the computer device 100 for dissipating heat amassed within the computer device 100. A rear flange 141 is bent from a top edge of the rear panel 14. A securing hole 143 is defined in the rear panel 14 in proximity to the rear flange 141. A securing piece 145 extends perpendicularly outwards from the rear panel 14. The securing piece 145 is spaced from the securing hole 143 and in proximity to the rear flange 141 of the rear panel 14. An axis of the CPU fan 123 is perpendicular to that of the system fan 147. A side flange 181 perpendicularly extends from each of the side panels 18 for supporting the cover plate 30.

The noise absorber 20 includes a flat bottom 22 and a plurality of regular wavy protrusions 24 extending downwards from the bottom 22. The bottom 22 of the noise absorber 20 is square, and a width of the bottom 22 is greater than a diameter of the circular outlet of the CPU fan 123, thereby the noise absorber 20 can cover the CPU fan 123 in up and down direction.

Figure 3:
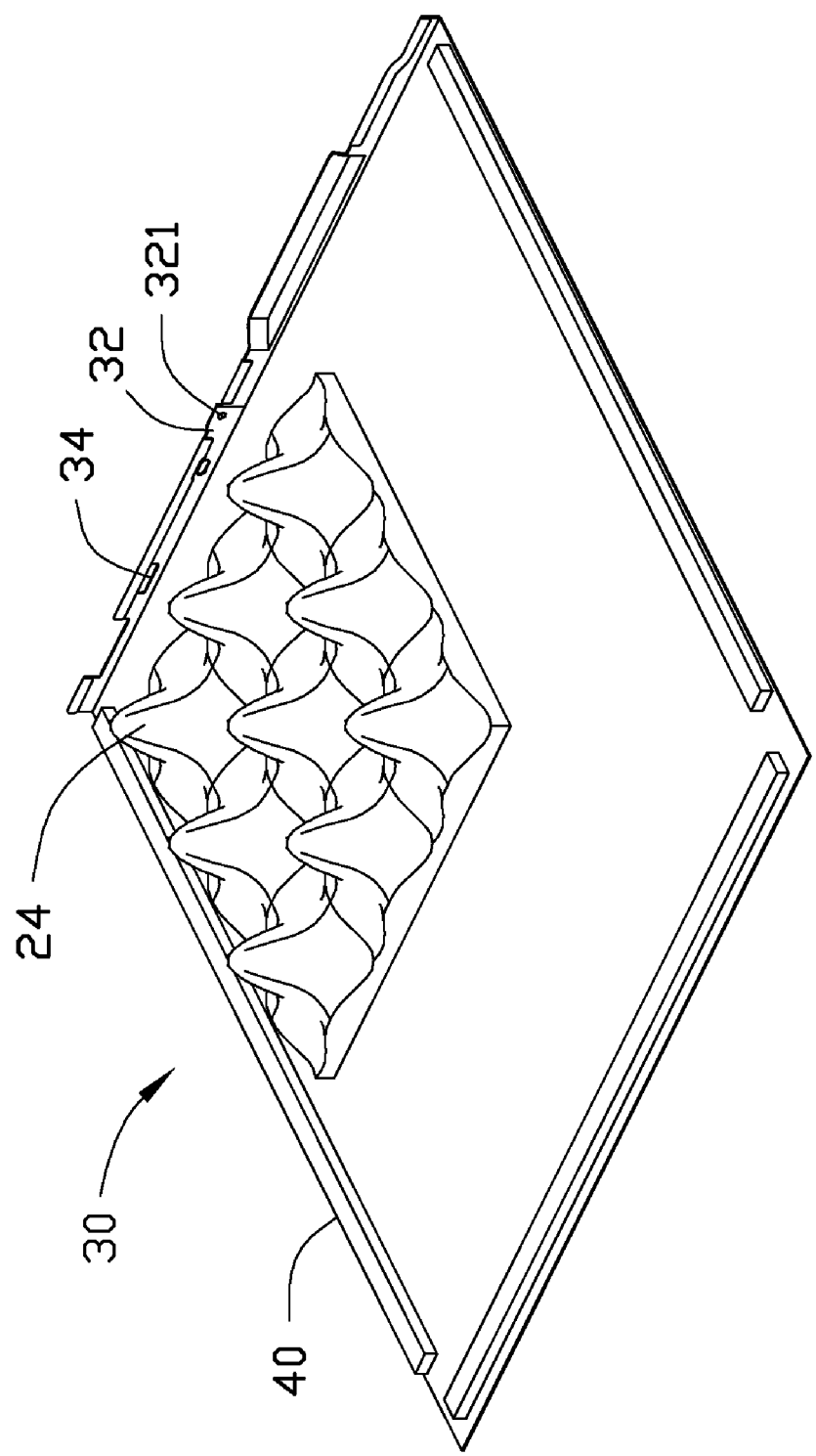
FIG. 3 is a partly assembled view of FIG. 1, but viewed from another aspect.

Referring to FIG. 3, three conductive foam pieces 40 are attached to the perimeter of the cover plate 30. The conductive foams 40 can be slit or manufactured into strips. The strips can then be attached to the perimeter of the metallic cover plate 40 by using an adhesive attachment method. These conductive foam pieces 40 have the advantage of being electrically conductive, flexible, and easily compressed, making them useful as EMI seals/gaskets between the cover plate 30 and the chassis 10.

A mounting piece 32 is bent from an edge of the cover plate 30. A mounting hole 321 corresponding to the securing hole 143 of the rear panel 14 of the chassis 10 is defined in the mounting piece 32. A securing slot 34 is defined in a flange (not labeled) of the cover plate 30 corresponding to the securing piece 145 of the rear panel 14 of the chassis 10.

Figure 4:
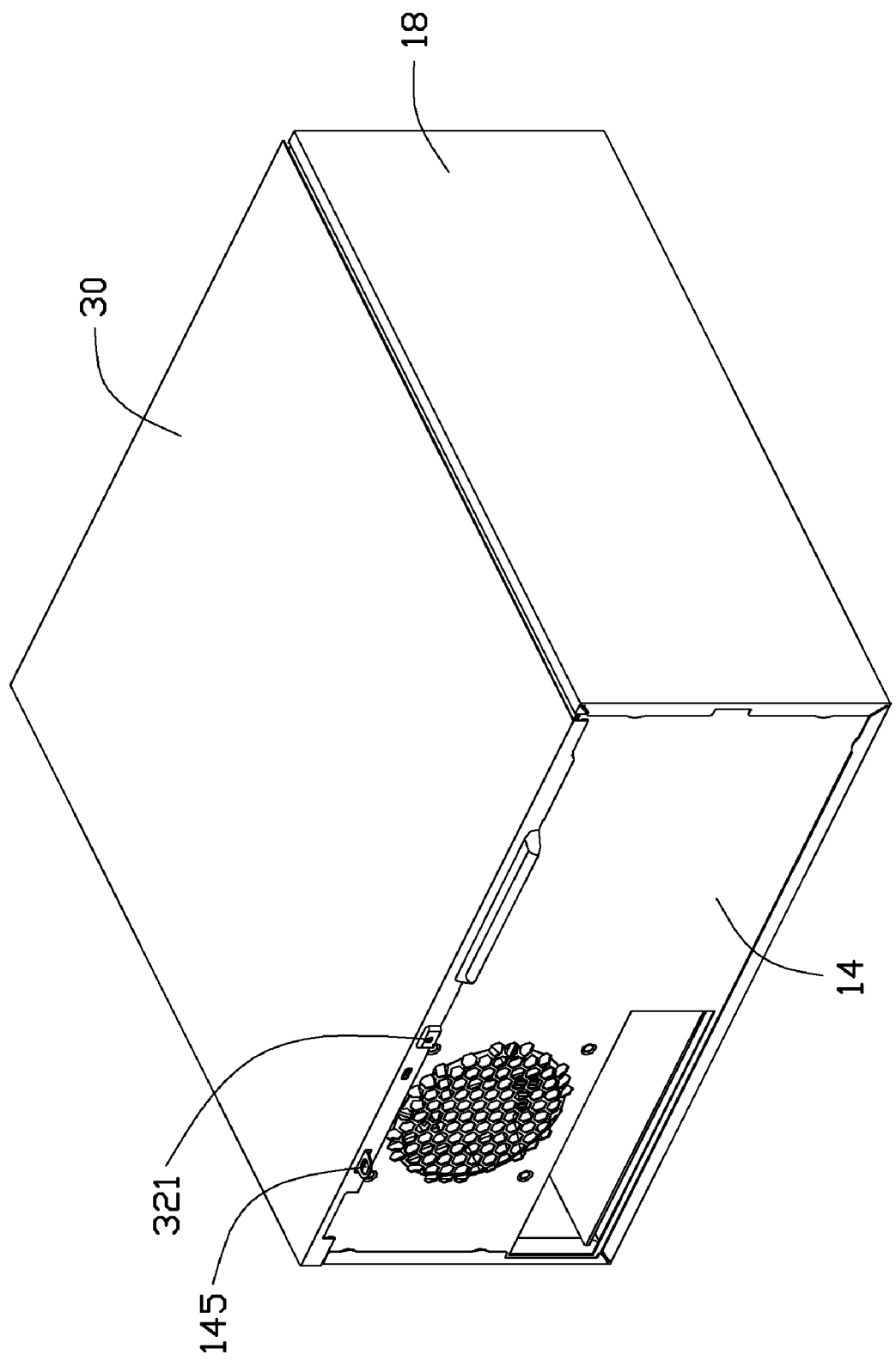
FIG. 4 is an assembled view of the computer device of FIG. 1.

Referring also to FIG. 4, in assembly, the noise absorber 20 is attached to the interior surface of the cover plate 30. The noise absorber 20 is in proximity to the system fan 147 and faces the CPU fan 123 for damping the flow of air that impacts the cover plate 30 and decreasing an acoustic noise level. The foam pieces 40 are tightly attached between the cover plate 30 and the flanges 141, 181 of the chassis 10 and capable of shielding EMI for the computer device 100. The securing piece 145 of the rear panel 14 extends through the securing slot 34 of the cover plate 30. The mounting hole 321 of the cover plate 30 aligns with the securing hole 143 of the rear panel 14. A screw (not shown) can be inserted into the mounting hole 321 of the cover plate 30 and the securing hole 143 of the rear panel 14 for securing the cover plate 30 on the chassis 10.

In the embodiment, an air current generated by the CPU fan 123 is perpendicular to the noise absorber 20 and the cover plate 30. The noise absorber 20 is made of noise absorbing material and includes a plurality of protrusions 24 that increase a surface area and decrease the surface pressure, thereby decreasing vibration and acoustic noise level of the computer system 100. Furthermore, the foam pieces 40 are capable of damping vibration and decreasing the acoustic noise. Thus, the computer system 100 can be cooled effectively by the fans 123, 147, while noise is kept to a minimum.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computer device comprising:
   a chassis with a first fan and a second fan installed therein;
   a cover plate attached to the chassis; and
   a noise absorber attached to the cover plate, the noise absorber comprising a plurality of protrusions facing the first fan and capable of damping the air flow that impacts the cover plate;
   wherein the first fan is capable of generating airflow that flows to the noise absorber to take heat away from the heat generating component in the chassis along a first direction, and the second fan is capable of generating airflow directed along a second direction to take heat out from the chassis, and the first direction is perpendicular to the second direction.

2. The computer device of claim 1, wherein the noise absorber comprises a flat bottom attached to the cover plate, the plurality of protrusions extend from the flat bottom towards the fan.

3. The computer device of claim 2, wherein the plurality of protrusions is regularly wave-shaped.

4. The computer device of claim 2, wherein the noise absorber is larger than an air outlet of the fan and capable of fully covering the fan and damping the air flow that impacts the cover plate.

5. The computer device of claim 2, wherein the air outlet of the fan is circular, the bottom of the noise absorber is square, and a width of the noise absorber is greater than a diameter of the circular air outlet of the fan.

6. The computer device of claim 1, wherein a plurality of conductive foams is attached between the cover plate and the chassis for preventing electro-magnetic interference and dampening vibration.

7. A computer device comprising:
   a chassis with a first fan and a second fan installed therein, the first fan capable of generating airflow directed along a first direction, the second fan capable of generating airflow directed along a second direction perpendicular to the first direction;
   a cover plate adapted to be attached to the chassis; and
   a noise absorber attached to the cover plate and capable of damping the airflow directed towards the cover plate in the first direction and decreasing an acoustic noise level of the computer device; and
   a plurality of conductive foams attached between the cover plate and the chassis.

8. The computer device of claim 7, wherein the noise absorber comprises a flat bottom attached to the cover plate and a plurality of protrusions extending from the flat bottom towards the fan.

9. The computer device of claim 8, wherein the plurality of protrusions is regularly wave-shaped.

10. The computer device of claim 8, wherein the noise absorber is larger than an air outlet of the fan and capable of fully covering the fan for damping the air flow that impacts the cover plate.

11. The computer device of claim 10, wherein the air outlet of the fan is circular, the bottom of the noise absorber is square, and a width of the noise absorber is greater than a diameter of the circular air outlet of the fan.

12. The computer device of claim 7, wherein the noise absorber is in proximity to the second fan and faces the first fan.

13. The computer device of claim 7, wherein the chassis comprises a bottom plate and a rear plate perpendicularly connected to the bottom plate, and the first fan is attached on the bottom plate, and the second fan is attached on the rear plate.

14. The computer device of claim 13, wherein a rear flange is bent from the rear panel, a securing piece extends perpendicularly outwards from the rear panel in proximity to the rear flange, and a securing slot is defined in a flange of the cover plate corresponding to the securing piece.

* * * * *